United States Patent
Varghese (10) Patent No.: US 9,245,187 B1
(45) Date of Patent: Jan. 26, 2016

(54) SYSTEM AND METHOD FOR ROBUST MOTION DETECTION

(71) Applicant: GEO SEMICONDUCTOR INC., San Jose, CA (US)

(72) Inventor: Gijesh Varghese, San Jose, CA (US)

(73) Assignee: GEO SEMICONDUCTOR INC., San Jose, CA (US)

( * ) Notice: Subject to any disclaimer, the term of this patent is extended or adjusted under 35 U.S.C. 154(b) by 0 days.

(21) Appl. No.: 14/324,593

(22) Filed: Jul. 7, 2014

(51) Int. Cl.
*G06K 9/00* (2006.01)
*G06T 7/20* (2006.01)

(52) U.S. Cl.
CPC ........ *G06K 9/00771* (2013.01); *G06K 9/00711* (2013.01); *G06T 7/2006* (2013.01); *G06T 2207/10016* (2013.01); *G06T 2207/10032* (2013.01); *G06T 2207/20144* (2013.01)

(58) Field of Classification Search
CPC combination set(s) only.
See application file for complete search history.

(56) References Cited

U.S. PATENT DOCUMENTS

| | | | |
|---|---|---|---|
| 5,787,199 A * | 7/1998 | Lee | 382/203 |
| 6,731,805 B2 | 5/2004 | Brodsky et al. | |
| 6,999,600 B2 | 2/2006 | Venetianer et al. | |
| 7,447,337 B2 * | 11/2008 | Zhang et al. | 382/107 |
| 8,081,682 B1 * | 12/2011 | Carbacea et al. | 375/240.24 |
| 8,121,424 B2 | 2/2012 | Almbladh | |
| 8,417,059 B2 * | 4/2013 | Yamada | 382/283 |
| 2002/0141637 A1 | 10/2002 | Brodsky et al. | |
| 2004/0260513 A1 | 12/2004 | Fitzpatrick et al. | |
| 2006/0088191 A1 * | 4/2006 | Zhang et al. | 382/107 |
| 2006/0218057 A1 | 9/2006 | Fitzpatrick et al. | |
| 2006/0245618 A1 | 11/2006 | Boregowda et al. | |
| 2007/0058837 A1 | 3/2007 | Boregowda et al. | |
| 2010/0183195 A1 | 7/2010 | Sharma | |
| 2010/0290710 A1 | 11/2010 | Gagvani et al. | |
| 2011/0064315 A1 | 3/2011 | Thomas et al. | |
| 2011/0206127 A1 * | 8/2011 | Nguyen et al. | 375/240.16 |
| 2011/0243385 A1 | 10/2011 | Nishino et al. | |
| 2011/0293190 A1 * | 12/2011 | O'Callaghan | 382/197 |
| 2012/0045090 A1 | 2/2012 | Bobbitt et al. | |
| 2012/0170659 A1 | 7/2012 | Chaudhury et al. | |
| 2012/0177121 A1 | 7/2012 | Tripathi et al. | |
| 2013/0148852 A1 * | 6/2013 | Partis et al. | 382/103 |
| 2013/0188689 A1 * | 7/2013 | Garbacea et al. | 375/240.03 |
| 2013/0251260 A1 | 9/2013 | Aerts et al. | |

OTHER PUBLICATIONS

Oliver Barnich, "Motion detection and human recognition in video sequences," Doctoral thesis, University of Liege, Belgium, academic year 2009-2010, pp. 1-103, English and French.

* cited by examiner

*Primary Examiner* — Anand Bhatnagar
(74) *Attorney, Agent, or Firm* — Sughrue Mion, PLLC (57) ABSTRACT

Method and system for detecting objects of interest in a camera monitored area are disclosed. Statistical analysis of block feature data, particularly Sobel edge and spatial high frequency responses is used to model the background of the scene and to segregate foreground objects from the background. This technique provides a robust motion detection scheme prone to catching genuine motions and immune against false alarms.

20 Claims, 5 Drawing Sheets

SYSTEM AND METHOD FOR ROBUST MOTION DETECTION

FIELD

The embodiments described herein relate generally to video processing, and particularly relate to intelligent detection of motion and objects of interest in a camera monitored area.

BACKGROUND

A growing number of cameras are being used for various monitoring and surveillance applications indoors and outdoors. Examples are monitoring networks for home and commercial properties, vehicle surveillance systems, airport securities, boarder patrolling, etc. Modern surveillance cameras are mostly stationary, although subject to unintentional jitters or displacements, and monitor the same scene over a long period of time. It would be beneficial to enable a monitoring system to automatically detect new activities in the scene. One way to achieve this is to model the background of the scene, such that objects that are not integral to the scene can be identified and segregated from the background. Accordingly, upon detecting anomalous objects moving to the scene, the system may raise an alarm of any sort or initiate further actions, such as fetching image data for object recognition analytics, recording and/or broadcasting video images to authorities, etc.

Most prior art on background modeling are based on pixel data processing. For example, a simple way to detect motion is to threshold collocated pixel difference in the successive video frames. If the difference is larger than a given threshold, motion is detected and an alert may be raised. This approach would not work in dynamic environments where the background of the monitored scene is not still. Examples of dynamic bodies are flowing water, waving trees, moving vegetation, and any other natural motions. Changing daylight conditions and flickering street lights are usually not of interest either. Traditional decision making using pixel values are sensitive to all these subtle variations. Furthermore, not all activities are genuine to trigger a security alarm. Further, as far as the economy of data handling is concerned, it would be costly to store and, more so, to transport unnecessary data.

A robust motion alarm should be resilient against false alarms, that include the above mentioned activities; but efficient in detecting salient activities such as moving people, animals or vehicles. Therefore, any technique that attempts to detect anomalous objects in the scene must be insensitive towards natural changes, but intelligently detect genuine moving objects over the background and handle useful data efficiently. The present invention utilizes an efficient background modeling technique to segregate a scene as foreground and background. The foreground areas are analyzed to detect new objects and verify genuine activities in the scene. Robustness of this approach is further achieved by rejecting false alarms. The background model may further be utilized in video compression application.

SUMMARY

The embodiments described herein provide in one aspect, a method for detecting motion in a sequence of video frames captured from a scene, each frame comprising a plurality of pixels grouped in a plurality of image blocks, said method comprising: receiving pixel data and block feature data for each of the plurality of blocks of a current frame and a previous frame, the block feature data being at least one of Sobel edge and spatial high frequency response values for each pixel averaged over the block; classifying the blocks as one of background, strong foreground, and weak foreground based on temporal profile of the block feature data; producing an initial list of rectangles that enclose a plurality of connected foreground block, wherein each rectangle is assigned with a strength score and a frame by frame tracking count; identifying the rectangles as one of: (i) new, (ii) persistent and (iii) recurring based on their strength score and tracking count; validating the new rectangles by comparing their constituent block data with that of corresponding collocated blocks from the previous frame; and producing a final list of rectangles comprising validated new, recurring and persistent rectangles.

The embodiments described herein provide in another aspect an electronic processor comprising: means for receiving data from a sequence of video frames captured from a scene, wherein each frame comprises a plurality of pixels grouped in a plurality of image blocks; means for receiving block feature data for each block of a current frame and a previous frame, the block feature data being at least one of Sobel edge and spatial high frequency response values of each pixel averaged over the block; wherein the processor is configured to detect motion in the scene by:
  (i) classifying the blocks as one of background, strong foreground, and weak foreground based on temporal profile of the block feature data;
  (ii) producing an initial list of rectangles that enclose a plurality of connected foreground block, wherein each rectangle is assigned with a strength score and a frame by frame tracking count;
  (iii) identifying the rectangles as one of new, persistent and recurring based on their strength score and tracking count;
  (iv) validating the new rectangles by comparing their constituent block data with that of corresponding collocated blocks from the previous frame; and
  (v) producing a final list of rectangles comprising validated new, recurring and persistent rectangles.

The embodiments described herein provide in another aspect a system for detecting motion in a scene, said system comprising: at least one stationary positioned capture device to capture a sequence of video frames from the scene, wherein each frame comprises a plurality of pixels grouped in a plurality of image blocks; an input interface configured for receiving pixel data and block feature data for each block of a current frame and a previous frame, the block feature data being at least one of Sobel edge and spatial high frequency response values of each pixel averaged over the block; and a processing unit configured for:
  (i) classifying the blocks as one of background, strong foreground, and weak foreground based on temporal profile of the block feature data;
  (ii) producing an initial list of rectangles that enclose a plurality of connected foreground block, wherein each rectangle is assigned with a strength score and a frame by frame tracking count;
  (iii) identifying the rectangles as one of new, persistent and recurring based on their strength score and tracking count;
  (iv) validating the new rectangles by comparing their constituent block data with that of corresponding collocated blocks from the previous frame; and (v) producing a final list of rectangles comprising validated new, recurring and persistent rectangles.

BRIEF DESCRIPTION OF THE DRAWINGS

For a better understanding of the embodiments and/or related implementations described herein and to show more clearly how they may be carried into effect, reference will now be made, by way of example only, to the accompanying drawings which show at least one exemplary embodiment and/or related implementation in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein.

However, it will be understood by those of ordinary skill in the art that the embodiments and/or implementations described herein may be practiced without these specific details. In other instances, well-known methods, procedures and components have not been described in detail so as not to obscure the embodiments and/or implementations described herein. Furthermore, this description is not to be considered as limiting the scope of the embodiments described herein, but rather to describe the structure and operation of the various embodiments and/or implementations described herein.

The term block in this description encompasses non-overlapping macroblocks (16×16 blocks) compliant with image compression standards, as well as blocks of other sizes such as conventional macroblock partitions. The term rectangle pertinent to block analysis refers to a rectangular portion, of any size (including squares), of the image that encloses an integer number of blocks.

Figure 1:
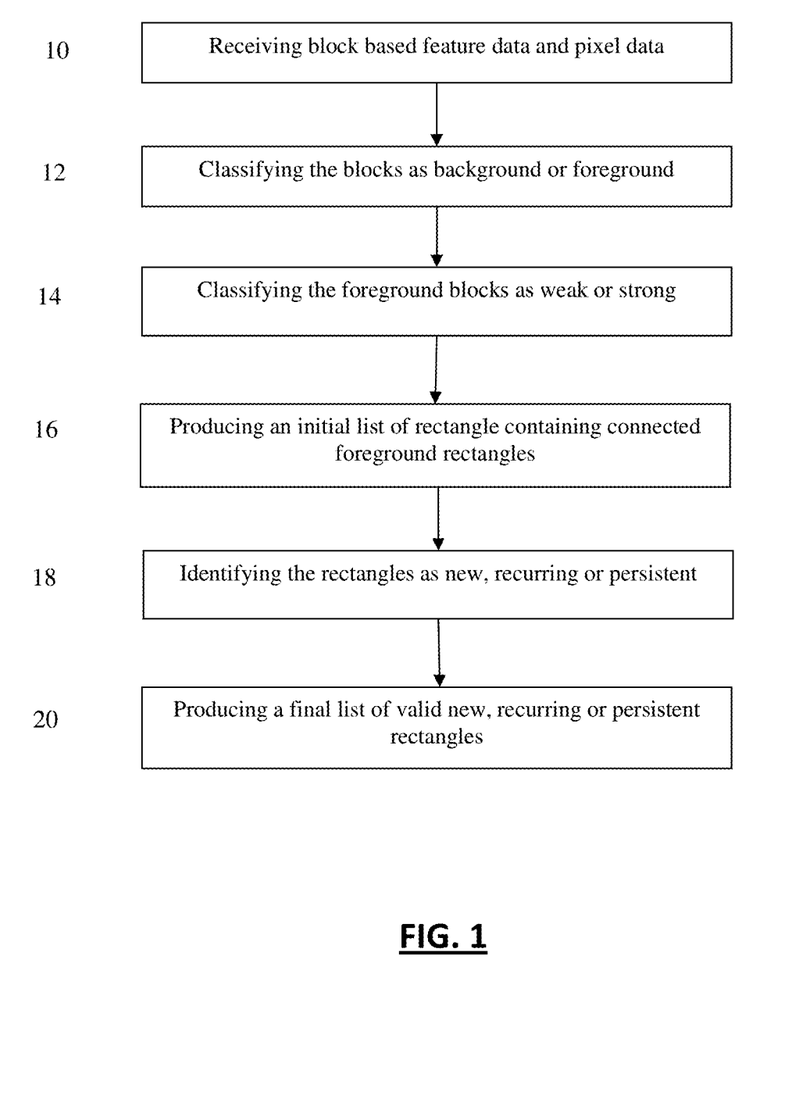
FIG. 1 illustrates steps of implementing a robust motion detection method, as embodied.

Referring to FIG. 1, an embodied method for detecting an object in a sequence of video frames is illustrated. In one exemplary embodiment, the sequence of video frames is part of a video clip captured by a capture device, e.g. a surveillance camera, in a stationary position. The embodied method may be implemented in an electronic chip for processing in real-time, in a computer-readable medium offline, or in general implemented by any computing means. For a current image frame in the image sequence, block based feature data are received 10 along with the pixel data (e.g. RGB or YUV coordinates). The preferred feature data are spatial high frequency and/or Sobel edge responses for every image block. Statistical analysis of these block features are used to classify the image blocks as either background or foreground 12, and further assign a strength to the foreground blocks 14. Detection of objects of interest may then be achieved in step 16 by grouping the connected foreground blocks and creating an initial list of rectangles encompassing regions of interest (ROI). Three classes of ROI are identified 18 for further analysis: new rectangles, recurring rectangles and persistent rectangle. The selected ROI need to be validated 20 as genuine in order to produce a final list of rectangles from the initial list comprising only the valid new rectangles, recurring rectangles and persistent rectangles.

Derivatives and gradients are commonly used in image processing for image enhancement. For instance, gradient of the image intensity function may be used to enhance the image contrast or sharpen an image. Gradient based filters such as Sobel are particularly effective in detecting edges and lines in the image where a discontinuity occurs. In one embodiment of the invention, a Sobel edge operator is applied to image pixels to obtain an edge response at the pixels. The Sobel responses within a block (e.g. a 16×16 block) of pixels may be averaged over the block to produce a block Sobel value that can be stored and supplied to a processing unit in step 10. This value also referred to as the Sobel feature of the block, should be collected for a statistically significant number of frames (preferably a minimum of 30 frames) for each block in the image. Since the Sobel response is stronger at edges and discontinuities in an image, a sudden spike in the response profile of a block may indicate that a new object has appeared in the scene.

In an alternative embodiment, a high pass Finite Impulse Response (FIR) filter may be applied to each pixel horizontally and vertically to produce a high frequency (HF) response for the pixel. HF filers too are used for sharpening an image and enhancing details in image processing. Similar to the Sobel edge feature, the spatial HF response of pixels within a block may be averaged over the block to produce a block high frequency response. Thus, every block would have an associated HF value.

One advantage of using either of derivative based Sobel edge or HF block features is that these values are insensitive to smooth changes in image intensity that have a continuous nature. In contrast, a pixel response to smooth changes, e.g. of ambiance light, may be similar to the response to an edge. Additionally, these block features are relatively inexpensive operations to generate in hardware (e.g. a factor of 250 less workload for VGA) and the block feature values are small for storing in memory. Accordingly, in another embodiment of the invention, both features may be collected and processed simultaneously as a cross check, to improve the robustness of the motion detection process.

Classifying blocks of the current image frame as background or foreground 12 may be achieved by analyzing time series values of the block features, namely the spatial high frequency and/or Sobel edge. The value of the block features may be monitored for each block in a collocated position of the frame over a period of time. In one embodiment, the features data are collected in a block histogram and continuously updated as new data arrives. The histogram may only have a restricted number of bins, in which case the least probable bin is replaced each time a new value for the feature that is not present in the histogram is encountered.

Figure 2:
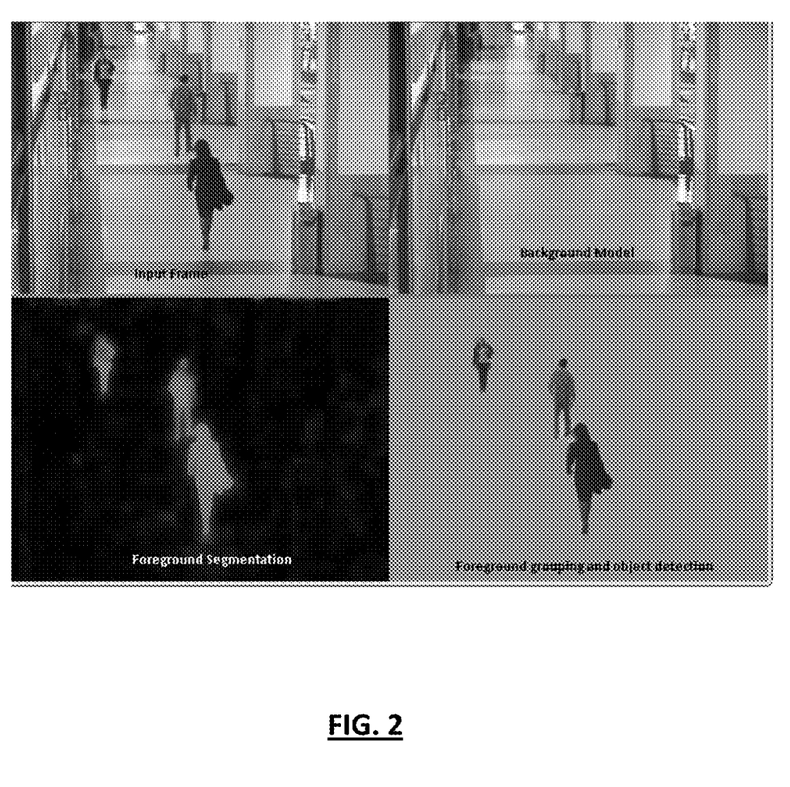
FIG. 2 illustrates an example of background modeling and foreground-background segregation.

In one embodiment, the background is modeled using the background blocks mapped from a plurality of video frames. The background model may be used to segregate the stationary and pseudo-stationary (e.g. flowing water, moving trees, etc.) parts of the scene from the actual objects of interest in the foreground. FIG. 2 illustrates an example of this process where the pedestrians are identified as foreground objects and segregated from the permanent features of the scene. In most cases, the background model needs to be modified constantly due to natural changes or addition and subtraction of objects in the scene. Basically, the algorithm is trained to re-evaluate significance of objects in the scene and keep the background model up-to-date.

Figure 3:
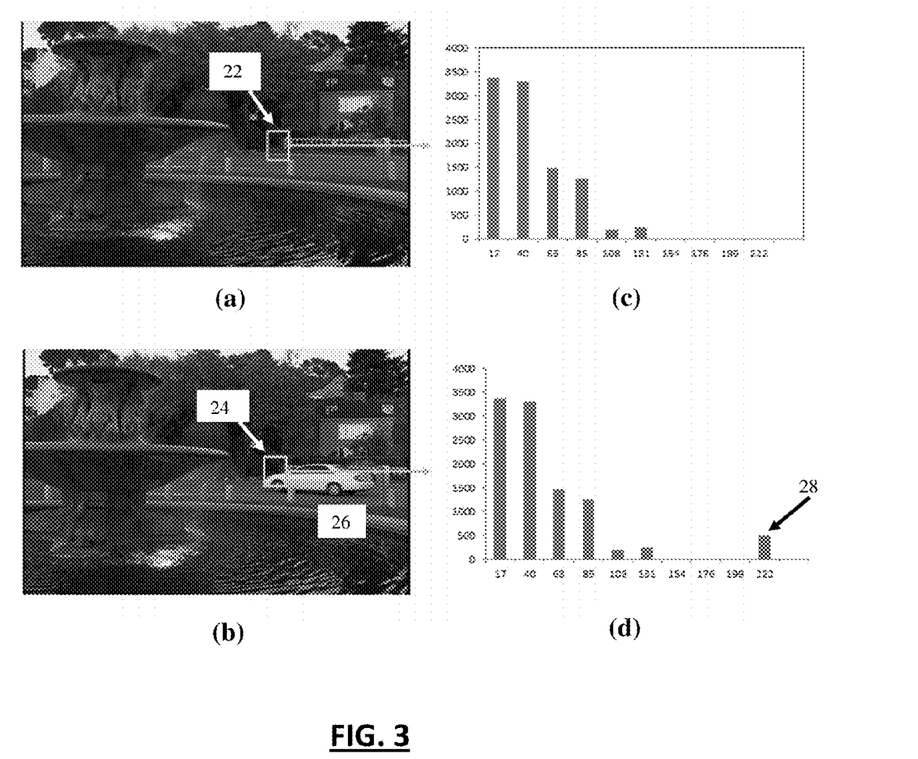
FIG. 3 illustrates a monitored scene without (a) and with (b) presence of a moving object, and their corresponding feature information histograms (c) and (d)

FIG. 3 illustrates two shots of the same scene (a) and (b), corresponding to two consecutive frames, as acquired by a camera locked in on the scene. A portion 22 of the image in (a) and its collocated portion 24 in (b), containing a new object 26 that has entered the scene, is selected. A quiet scene without a salient event would look like image (a). Accordingly, everything in (b), including the pond and the fountain, would be classified as background except for the car 26. Sobel edge feature histograms (c) and (d) for a given block in the selected regions 22 and 24 are also shown in FIG. 3. For each bin of the histograms, there exists a time span (not shown in the figure) in addition to a count (vertical axis) and its feature values (horizontal axis). The count indicates the frequency or number of occurrences of the bin value during an interval of time. The time span indicates how long ago the bin value was observed recently. Generally, a large value indicates that it was observed very recently and smaller time spans indicate otherwise. The time span of a bin is set to the maximum value each time it is observed, and is continuously decremented each time the bin value is not observed. The bin value is removed from the histogram when the time span becomes zero. If a new feature value is observed and histogram bins are full then the bin with least time span is replaced to accommodate observation of the new value. For example, bin 28 indicates a new feature value that arose following the entrance of the car 26 to the scene.

In one exemplary embodiment, the mean and variance of the feature data distribution is calculated from the related histogram using those bins whose count is more than a threshold:

$$D = \frac{|x - \mu|}{\sigma} \quad (1)$$

wherein (D) is the distance of feature value x from the mean ($\mu$), normalized to the standard deviation ($\sigma$). Each new observation (e.g. 28) may therefore be classified as background or foreground based on its normalized distance from the mean of the histogram. In this example, a block is classified as background if D is smaller than a first (or long) threshold or foreground if larger. Root mean square (RMS) of the distribution may also be used in (1) instead of the absolute difference in the nominator.

Foreground blocks may further be classified as weak or strong 14 based on the more recent history of the block feature. A short term running average of the feature may be calculated for each corresponding block from the previous frames. Similar to equation (1), a normalized distance ($D_s$) of the feature value x from its running average ($\mu_s$) may be calculated:

$$D_s = \frac{|x - \mu_s|}{\sigma_s} \quad (2)$$

If the short term normalized distance is smaller than a second (or short) threshold, then the block is labeled as a weak foreground. Otherwise, the block will be labeled as a strong foreground. In one embodiment, a running sum (S) is updated using an IIR filter to generate the running average:

$$S = x + \frac{N-1}{N} S \quad (3)$$

where N is the short term learning time. And the running average would be:

$$\mu_s = \frac{S}{N} \quad (4)$$

It should be noted that the short and long thresholds may be dynamic values that are determined by the model and change according to the learning experience of the algorithm.

Therefore, the output of stage 14 is a binary background map and a foreground strength score for the entire current frame. According to a preferred embodiment of the invention, using both Sobel edge and HF response would have the advantage of providing a cross-check on block classification. In this case, a block is classified as foreground if at least one of the features classifies it as a weak or strong foreground. If one feature finds a weak block and the other misses that, the block would still be labeled as a weak foreground. Also, two strength scores corresponding to the two features would be outputted which will be referred to as strength vector of the block.

Once every block is characterized based on the above criteria, a background map may be generated corresponding to the monitored block feature. Generally, there would be differences in the maps generated for the Sobel edge and the spatial high frequency features, resulting in two separate and slightly different maps. In the preferred embodiment where both features are exploited, the two maps may be combined (e.g. using a logic OR) to produce a final background map. Keeping track of the background maps over multiple frames would allow updating the background model of the scene, as shown in the example of FIG. 2. The time frame needed for modeling the background is also referred to as the learning time, during which the model is updated. Typically, it would take a shorter time frame to keep a moving average for a block feature than the learning time. Accordingly, the foreground blocks may be validated using the short term running average as quantified in equations (2)-(4). For instance, if the learning time is about 3 seconds (100 frames), the short term running average may be as short as 0.3 seconds (or 10 frames).

In addition to facilitating detection of foreground objects for alarming, a background model may be utilized for other follow-up processing operations such as image analytics and image compression. In one embodiment, non-overlapping 16×16 pixel macroblocks are used for background/foreground formation in compliance with the video compression standards (e.g. H.264). In video applications where the camera is practically stationary; such as surveillance and video conferencing, the background model may be used for efficient compression of the video sequence. For example, in an inter-frame prediction scheme, an encoder may take advantage of temporal redundancy between neighboring frames to achieve higher compression rates. If the model indicates that there is no genuine activity in the scene, the encoder could skip the quiet frames and lower the encoding bit-rate. The bit-rate may later be increased when sufficient activity is detected. In order words, the background model helps keeping a reference frame for a longer time. Subsequent frames can be skipped until a new object is detected in the foreground. In this case, SKIP mode compression may be tried early enough when trying a set of compression modes. This will help in early decision making during compression, making it faster and reducing the size of the compressed video significantly.

Identification and segmentation of foreground objects from the background may be carried out by grouping all the foreground blocks into a plurality of blobs based on their connectivity to other foreground blocks. A foreground block is considered part of a blob if any of its eight neighbors is part of the blob. This technique is referred to as connected component analysis. In order to filter out noise, a blob should contain at least three macroblocks. All final blobs may be bounded within a plurality of rectangles which indicate a potential salient object in the scene. The first list of foreground rectangles surrounding the foreground candidates is referred to as the initial list 16. Both types of foreground blocks labeled as weak or strong participate in the grouping at this stage.

Each image frame will further have a final list of rectangles 20 to be obtained upon validation of the identified rectangles 18 in the initial list 16. That is, the final list of rectangles would contain genuine new objects of interest. The rest will be either rejected from the initial list as false alarm or relabeled as a recurring object. A foreground strength value (or vector in case of both features are present), being the total number of strong foreground blocks inside the rectangle, is also assigned to each identified rectangle. Therefore, both weak and strong foreground blocks participate in the grouping, but only strong blocks are used for validation and tracking purposes. This so-called score is provided for each of the block features separately. The foreground strength vector serves as a measure to prune rectangles in later stages 20.

Furthermore, a frame by frame tracking history may be maintained for each rectangle. The rectangles from the initial lists of current and previous frames, whose foreground strength vector is above an acceptable threshold, are compared to find matching rectangles. Only strong foreground blocks are considered for tracking. The relative change in size and shift in position of the rectangles are used to validate a match. Sometimes rectangles may fail these two validation tests even when they overlap, so they will still be considered a match if the previous rectangle has been persistent on the scene for a while. Once a match has been determined the rectangle's tracking count is incremented and is assigned a tracking parent from one of the previous frames.

In one embodiment, identification of the rectangles in stage 18 is carried out as follows. In addition to the initial list of rectangles in the current frame, the initial list and the final list of rectangles in the previous frame, and the luminance pixel values of current and previous frames are inputted. The rectangles from the initial list of current frame which do not have a tracking parent (i.e. tracking count=0) in the final list of the previous frame are named as new rectangles. It is possible that a rectangle may have a parent in the previous initial list, but not in the previous final list, i.e. not validated in the previous frame. These new rectangles may or may not indicate genuine objects, and as such; they should not be eliminated yet. According to one embodiment, the new rectangles are validated if they satisfy the following conditions: a) the Sum of Absolute Differences (SAD) between the pixel data of the current rectangle and its collocated rectangle from previous frame is above a limit b) the L2 norm between the histograms of the corresponding rectangles is above a threshold c) the foreground strength vector of the rectangle is above a strength threshold.

Figure 4:
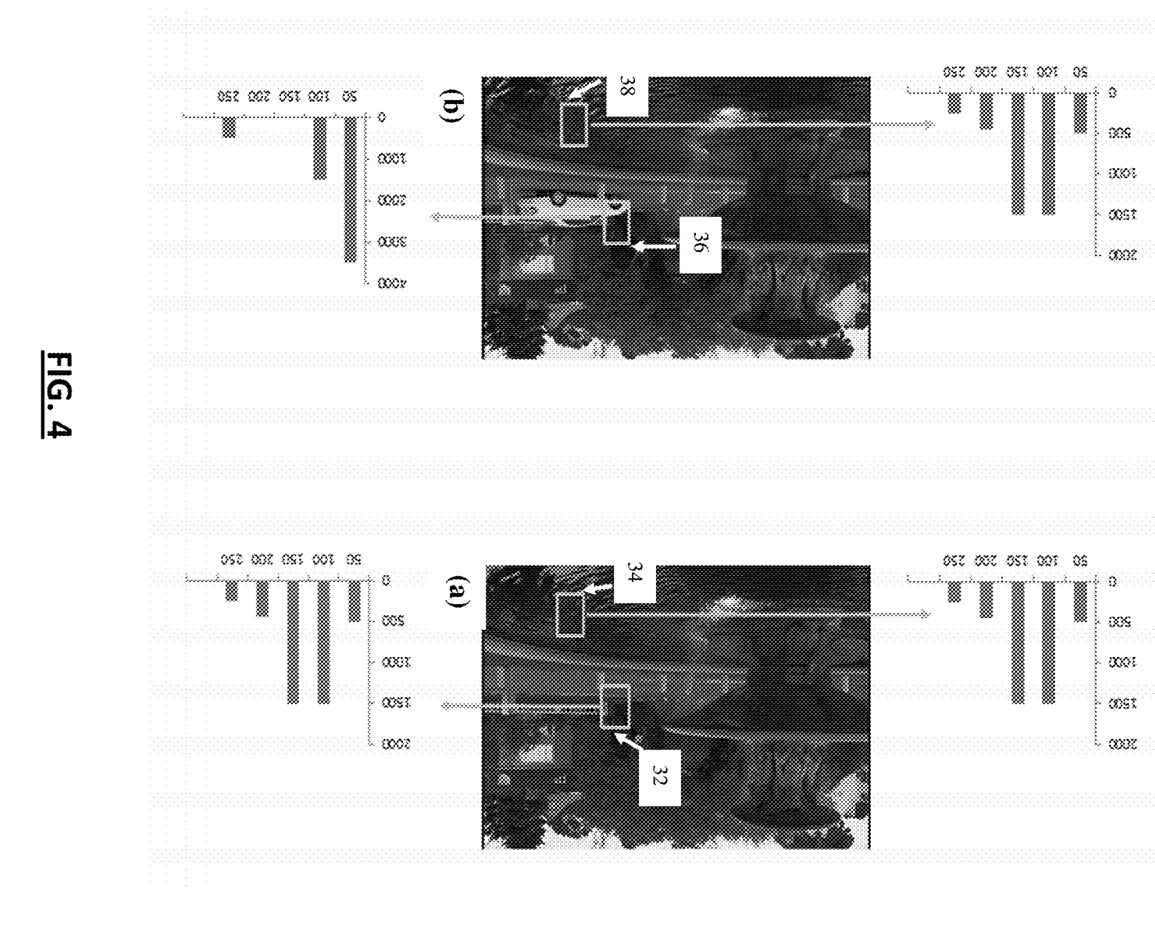
FIG. 4 illustrates the histograms for a new and a recurring rectangle, respectively containing genuine and background moving objects.
Figure 5:
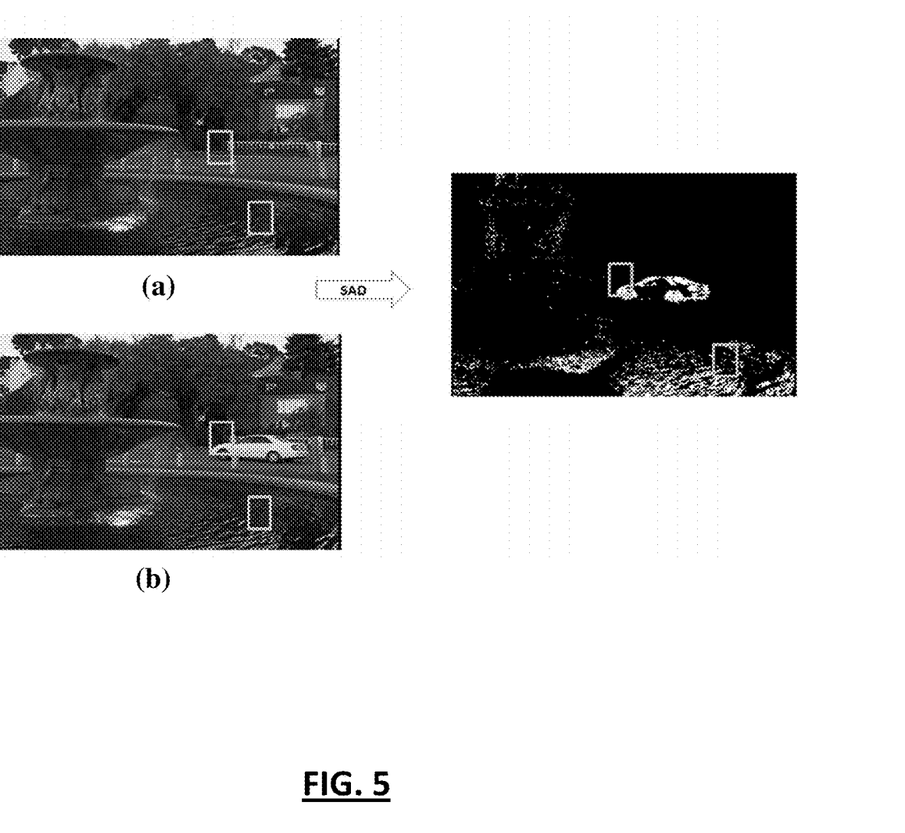
FIG. 5 illustrates a Sum of Absolute Difference between the same two images in FIG. 4. A new and a recurring rectangle, respectively containing genuine and background moving objects, are identified.

In FIG. 4, two rectangles 36 and 38 are identified in the current frame (b) where activities have been detected. The corresponding collocated rectangles 32 and 34 are shown in the previous frame (b). Applying the above criteria, one should validate the rectangle 36 containing the car as a genuine and reject rectangle 38 that contains irrelevant water movements. FIG. 5 illustrates the SAD between frames (a) and (b), in accordance with the first part of the above criteria. The same rectangles are shown in the SAD image too.

New rectangles that fail the above validation could still represent genuine objects. For such rectangles to be recovered, their tracking count should be verified to be above an acceptable threshold, because genuine objects remain on the scene for long. These rectangles are labeled as persistent rectangles. For example, if this threshold is set at 30, it means the object has been in the scene for at least 1 second (for a 30 frame/sec rate). The remaining rectangles in the initial list that are not in the new rectangles (valid or invalid) list are recurring rectangles. The rectangles that have an overlapping rectangle in the final list of the pervious frame are added to the recurring rectangles. In a sense, a feedback mechanism is exploited, based on tracking history of the rectangles, to identify recurring objects and separate them from the genuine objects. The new and persistent rectangles contain genuine objects of interest and should raise alert, while recurring rectangles indicate irrelevant motions in the background. The final list of rectangles is created from the previous stage by combining valid new, recurring and persistent rectangles.

According to another embodiment of the invention, the described methods of motion detection may be implemented by an electronic processor. The processor receives the input data, and is configured to implement the steps as shown in FIG. 1 in accordance with the embodied methods in the invention. The processor may be integrated with other processing elements of the camera, or may be stand alone. In particular, the processor may further compress all or parts of the video clip for recordation and/or transmission.

According to yet another embodiment of the invention, a system comprising at least one capture device, e.g. video cameras, and a processing unit (also referred to as processor) is used for detecting new objects in a scene. A sequence of video images captured by the camera is inputted to the processor via an interface. The processor may be configured to implement the steps as shown in FIG. 1 in accordance with the embodied methods in the invention.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A method for detecting motion in a sequence of video frames captured from a scene, each frame comprising a plurality of pixels grouped in a plurality of image blocks, said method comprising:

(a) receiving pixel data and block feature data for each of the plurality of blocks of a current frame and a previous frame, the block feature data being at least one of Sobel edge and spatial high frequency response values for each pixel averaged over the block;
(b) classifying the blocks as one of background, strong foreground, and weak foreground based on temporal profile of the block feature data;
(c) producing an initial list of rectangles that enclose a plurality of connected foreground block, wherein each rectangle is assigned with a strength score and a frame by frame tracking count;
(d) identifying the rectangles as one of: (i) new, (ii) persistent and (iii) recurring based on their strength score and tracking count;
(e) validating the new rectangles by comparing their constituent block data with that of corresponding collocated blocks from the previous frame; and
(f) producing a final list of rectangles comprising validated new, recurring and persistent rectangles.

2. The method of claim 1, wherein distribution of the at least one feature data, monitored for a period of time, is represented in a histogram.

3. The method of claim 2, wherein a block is classified as background if the normalized distance of the block feature value from the mean of the histogram is smaller than a first threshold, or as foreground if larger.

4. The method of claim 3, wherein the strength score for the rectangle is calculated as total number of strong foreground blocks within the rectangle.

5. The method of claim 2, wherein a foreground block is classified as strong if the feature value has a deviation from a short term running average larger than a second threshold, or weak if smaller.

6. The method of claim 1, where background of the scene is modeled by mapping the background blocks from a plurality of frames.

7. The method of claim 6, wherein the background model is used for inter-frame encoding of the sequence of video frames.

8. The method of claim 7, wherein encoding bit-rate is lowered by skipping frames when no activity is detected in the scene.

9. The method of claim 1, wherein the spatial high frequency and the Sobel edge features data are collected and processed simultaneously.

10. The method of claim 9, wherein a first background map produced from the Sobel edge data is combined with a second background map produced from the spatial high frequency data to produce a final background map.

11. The method of claim 9, wherein a block is classified as foreground if at least one of the features classifies the block as a foreground block.

12. The method of claim 1, wherein the tracking count is incremented when an overlap with a rectangle from the initial list of rectangles in the previous frame is found.

13. The method of claim 1, wherein frame to frame relative changes in size and shift in position of the rectangles are used to validate a match.

14. The method of claim 1, wherein a rectangle is validated as a new rectangle if the following measures are above given thresholds:
(i) the Sum of Absolute Differences (SAD) between the pixel data of the current rectangle and its collocated rectangle from the previous frame;
(ii) L2 norm between histograms of the two rectangles; and
(iii) foreground strength of the rectangle is above a strength threshold.

15. The method of claim 1, wherein an alarm is issued upon validation of the new rectangles.

16. The method of claim 1, wherein validation of the new rectangles triggers at least one of recording, transmission and content analysis of the frames.

17. An electronic processor comprising:
(a) means for receiving data from a sequence of video frames captured from a scene, wherein each frame comprises a plurality of pixels grouped in a plurality of image blocks;
(b) means for receiving block feature data for each block of a current frame and a previous frame, the block feature data being at least one of Sobel edge and spatial high frequency response values of each pixel averaged over the block;
wherein the processor is configured to detect motion in the scene by:
(i) classifying the blocks as one of background, strong foreground, and weak foreground based on temporal profile of the block feature data;
(ii) producing an initial list of rectangles that enclose a plurality of connected foreground block, wherein each rectangle is assigned with a strength score and a frame by frame tracking count;
(iii) identifying the rectangles as one of new, persistent and recurring based on their strength score and tracking count;
(iv) validating the new rectangles by comparing their constituent block data with that of corresponding collocated blocks from the previous frame; and
(v) producing a final list of rectangles comprising validated new, recurring and persistent rectangles.

18. The processor of claim 17, wherein said processor is configured to model background of the scene by mapping the background blocks from a plurality of frames.

19. The processor of claim 18, wherein said processor is configured to implement the background model in inter-frame encoding of the sequence of video frames.

20. A system for detecting motion in a scene, said system comprising:
(a) at least one stationary positioned capture device to capture a sequence of video frames from the scene, wherein each frame comprises a plurality of pixels grouped in a plurality of image blocks;
(b) an input interface configured for receiving pixel data and block feature data for each block of a current frame and a previous frame, the block feature data being at least one of Sobel edge and spatial high frequency response values of each pixel averaged over the block; and
(c) a processing unit configured for:
(i) classifying the blocks as one of background, strong foreground, and weak foreground based on temporal profile of the block feature data;
(ii) producing an initial list of rectangles that enclose a plurality of connected foreground block, wherein each rectangle is assigned with a strength score and a frame by frame tracking count;
(iii) identifying the rectangles as one of new, persistent and recurring based on their strength score and tracking count;
(iv) validating the new rectangles by comparing their constituent block data with that of corresponding collocated blocks from the previous frame; and
(v) producing a final list of rectangles comprising validated new, recurring and persistent rectangles.

* * * * *